United States Patent [19]
Wang

[11] Patent Number: 6,097,799
[45] Date of Patent: Aug. 1, 2000

[54] PAY PHONE BOX STRUCTURE

[75] Inventor: Hsiu-Bin Wang, Taipei, Taiwan

[73] Assignee: Protel Pacific Corporation, Taipei, Taiwan

[21] Appl. No.: 09/120,400

[22] Filed: Jul. 22, 1998

[51] Int. Cl.[7] .................................................. H04M 1/00
[52] U.S. Cl. ......................... 379/143; 379/440; 312/326; 312/223.4
[58] Field of Search .................................. 375/145, 155, 375/143, 428, 437, 440; 144/350; 312/326, 329, 223.4

[56] References Cited

U.S. PATENT DOCUMENTS 4,974,257  11/1990  Ibanez ...................................... 379/145
5,061,023  10/1991  Soubliere et al. .................... 312/223.4

*Primary Examiner*—Paul Loomis
*Attorney, Agent, or Firm*—Hedman, Gibson & Costigan, P.C.

[57] ABSTRACT

A pay phone box structure includes a casing having a first side wall and a second side wall, a first supporting plate fixedly mounted on the first side wall of the casing and containing a plurality of first locking slots, a second supporting plate fixedly mounted on the second side wall of the casing and containing a plurality of second locking slots, a suspension bar secured to the second supporting plate and having a plurality of first locking hooks each detachably received in the second locking slots, a pivot plate pivotally mounted on the suspension bar and having an upper end portion and a lower end portion, a cover pivotally mounted on the casing and having a first side wall, a second side wall secured to the pivot plate, a closed wall and an open wall, a sliding plate slidably mounted on the first side wall of the cover and having a plurality of second locking hooks each detachably received in the first locking slots, and a U-shaped pivot bar pivotally mounted on the closed wall of the cover and having a first leg pivotally connected with the sliding plate and a second leg pivotally connected with the lower end portion of the pivot plate.

6 Claims, 6 Drawing Sheets

PAY PHONE BOX STRUCTURE

FIELD OF THE INVENTION

The present invention relates to a box structure, and more particularly to a pay phone box structure.

BACKGROUND OF THE INVENTION

A conventional pay phone box structure is shown in FIG. 6, and there will be a complete explanation in the detailed description of the preferred embodiments, concerning the conventional pay phone box structure. The present invention has arisen to mitigate and/or obviate the disadvantage of the conventional pay phone box structure.

SUMMARY OF THE INVENTION

In accordance with one aspect of the present invention, there is provided a pay phone box structure comprising a casing including a first side wall and a second side wall, a first supporting plate fixedly mounted on the first side wall of the casing and containing a plurality of elongated first locking slots, a second supporting plate fixedly mounted on the second side wall of the casing and containing a plurality of elongated second locking slots, an elongated suspension bar secured to the second supporting plate and including a plurality of first locking hooks each detachably received in the corresponding second locking slot, a pivot plate pivotally mounted on the suspension bar and including an upper end portion and a lower end portion, a cover pivotally mounted on the casing and including a first side wall, a second side wall secured to the pivot plate, a closed wall and an open wall, a sliding plate slidably mounted on the first side wall of the cover and including a plurality of second locking hooks each detachably received in the corresponding first locking slot, and a substantially U-shaped pivot bar pivotally mounted on the closed wall of the cover and including a first leg pivotally connected with the sliding plate and a second leg pivotally connected with the lower end portion of the pivot plate.

Further benefits and advantages of the present invention will become apparent after a careful reading of the detailed description with appropriate reference to the accompanying drawings.

DETAILED DESCRIPTION OF THE PREFERRED EMBODIMENTS

Figure 6:
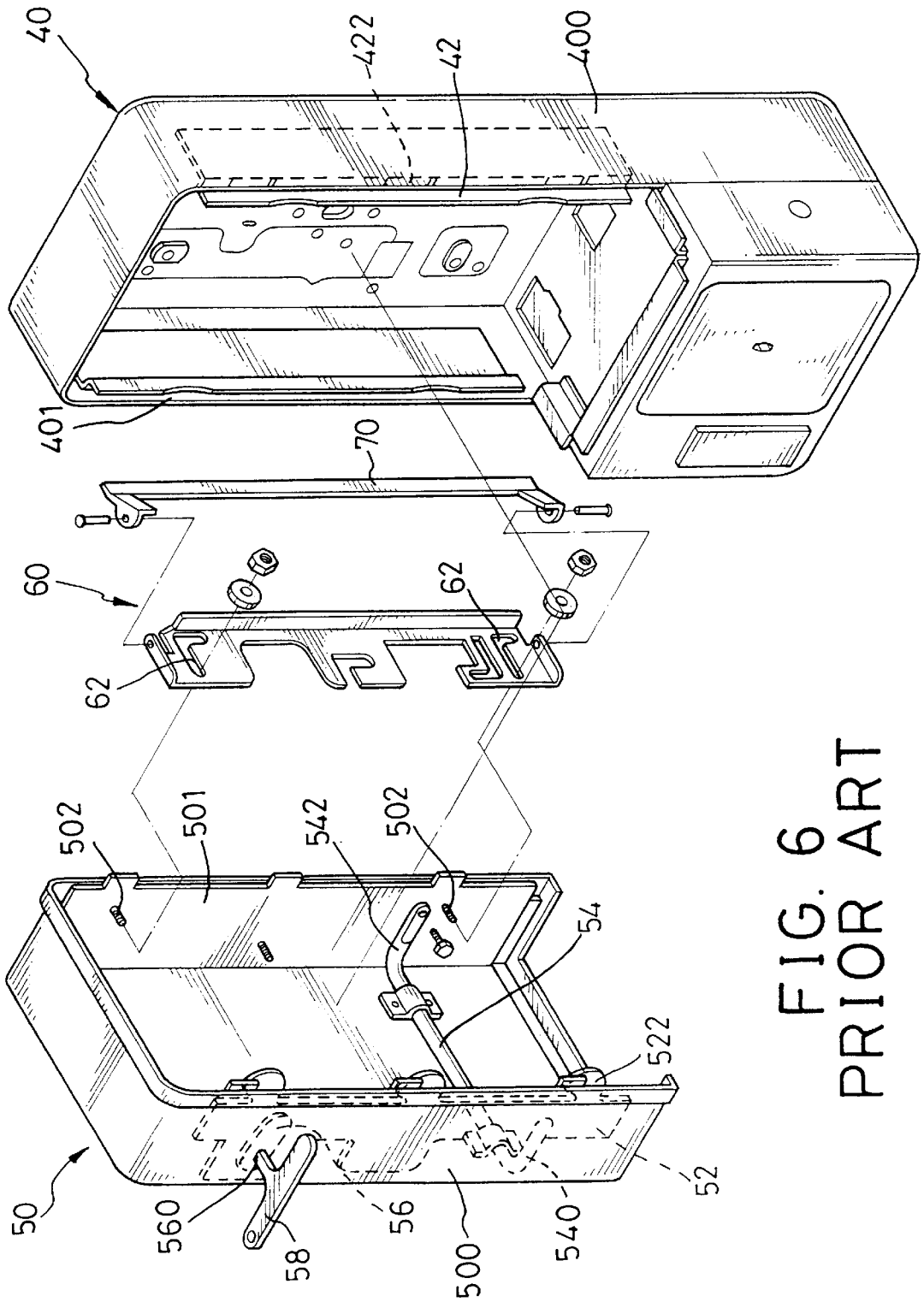
FIG. 6 is an exploded view of a conventional pay phone box structure in accordance with the prior art.

For a better understanding of the present invention, reference is made to FIG. 6 illustrating a conventional pay phone box structure in accordance with the prior art.

The conventional pay phone box structure comprises a casing 40 including a first side wall 400 and a second side wall 401, a supporting plate 42 fixed on the first side wall 400 of the casing 40 and containing a plurality of locking slots 422, a suspension bar 70 fixedly attached to the second side wall 401 of the casing 40, a pivot plate 60 pivotally connected with the suspension bar 70 and including an upper end portion and a lower end portion each containing a substantially inverted L-shaped guiding slot 62, a cover 50 including a first side wall 500 and a second side wall 501 formed with two guiding posts 502 each movably secured in one of the two corresponding guiding slots 62, a sliding plate 52 slidably mounted on the first side wall 500 of the cover 50 and including a plurality of locking hooks 522 each extending upward and each detachably received in one of the corresponding locking slots 422, a pivot bar 54 pivotally mounted on the cover 50 and including a first leg 540 pivotally mounted on the lower end portion of the sliding plate 52 and a second leg 542 pivotally connected with the lower end portion of the pivot plate 60, and a driving member 56 rotatably mounted on the first side wall 500 of the cover 50 and including a first end portion pivotally connected with the upper end portion of the sliding plate 52 and a second end portion containing a socket 560 into which a key 58 can be inserted.

In operation, the driving member 56 can be rotated by means of rotating the key 58 in a clockwise direction so as to move the sliding plate 52 downward, thereby moving down each of the locking hooks 522 to detach from each of the locking slots 422 such that the cover 50 can be pivoted outward relative to the casing 40 by means of pivoting the pivot plate 60 relative to the suspension bar 70. At the same time, the cover 50 can be moved outward relative to the pivot plate 60, thereby displacing each of the guiding posts 502 along the guiding slot 62.

By such an arrangement, however, the suspension bar 70 is fixed on the casing 40 such that the cover 50 cannot be removed from the casing 40, thereby easily incurring inconvenience during maintenance of the pay phone box structure. In addition, the user cannot replace the cover 50 individually when it is worn out, thereby easily causing waste. Moreover, the cover 50 tends to wobble due to each of the guiding posts 502 being able to slide along each of the guiding slots 62, thereby easily causing a disturbance during maintenance.

Figure 1:
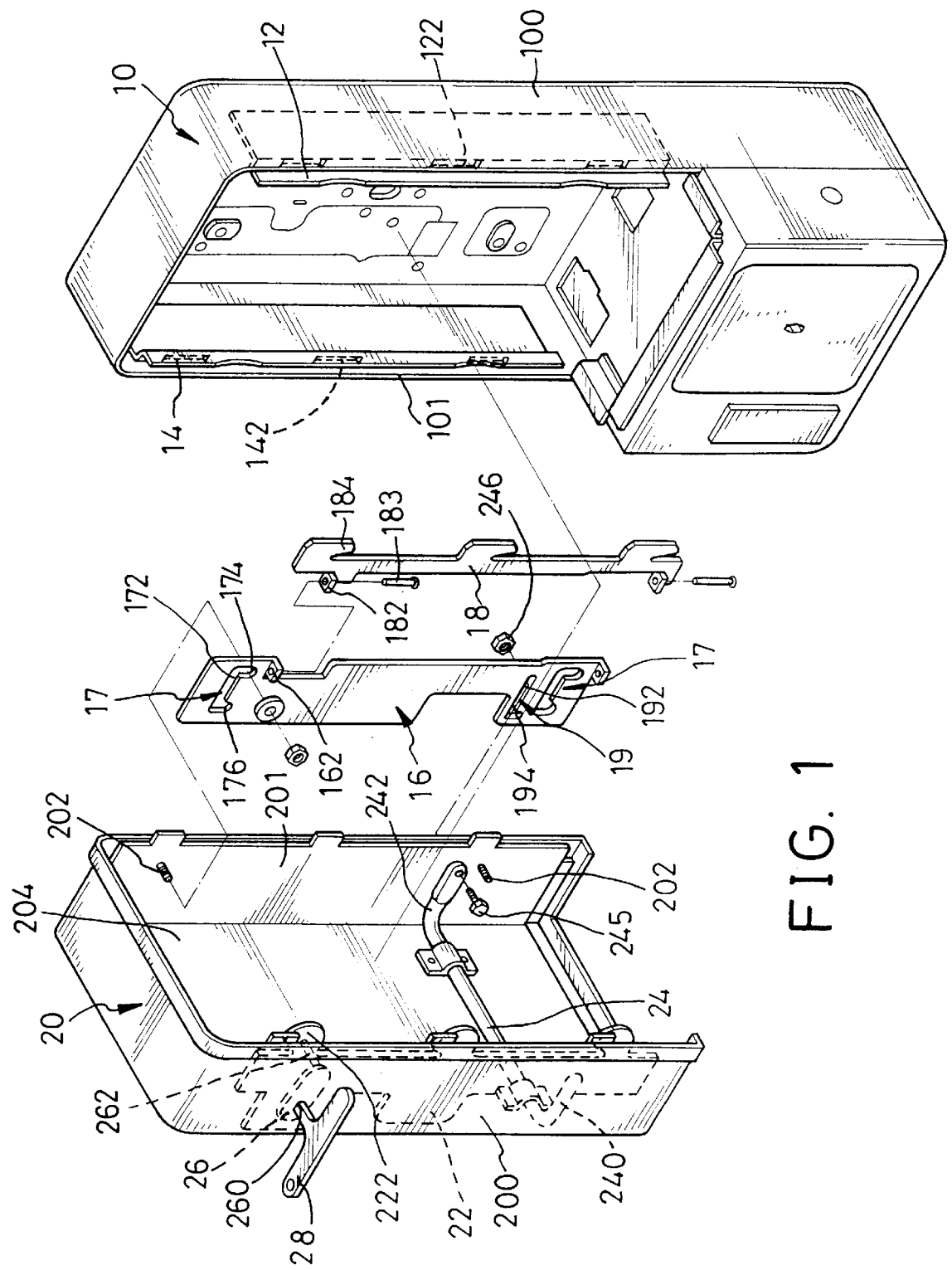
FIG. 1 is an exploded view of a pay phone box structure in accordance with the present invention.
Figure 2:
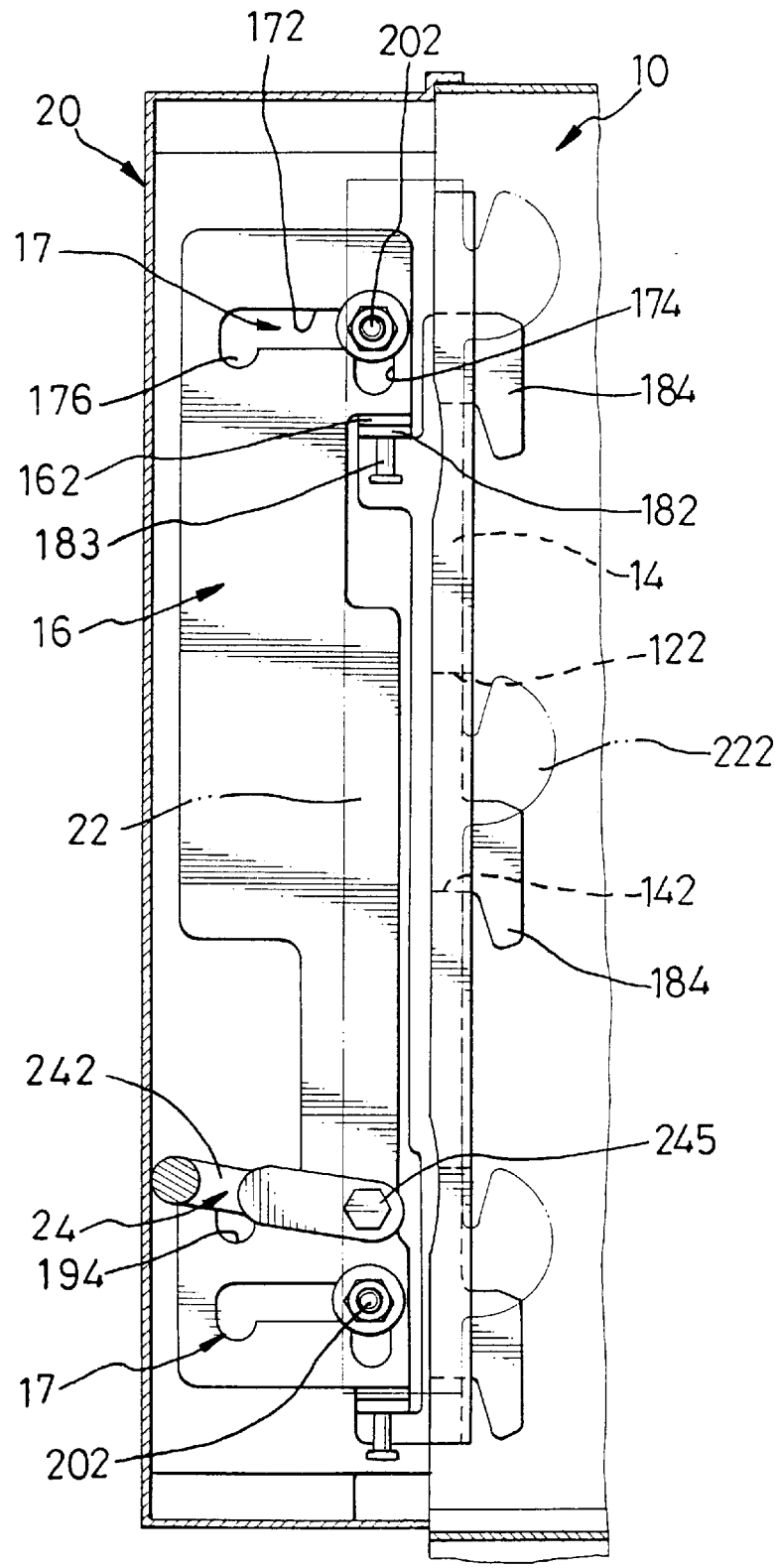
FIG. 2 is a side plan cross-sectional assembly view of the pay phone box structure as shown in FIG. 1, wherein the cover is fixed to the casing.

Referring now to FIGS. 1 and 2, a pay phone box structure in accordance with the present invention comprises a casing 10 including a first side wall 100 and a second side wall 101, a first supporting plate 12 fixedly mounted on the first side wall 100 of the casing 10 and containing a plurality of elongated first locking slots 122, a second supporting plate 14 fixedly mounted on the second side wall 101 of the casing 10 and containing a plurality of elongated second locking slots 142, an elongated suspension bar 18 secured to the second supporting plate 14 and including a plurality of first locking hooks 184 each extending downward and each detachably received in the corresponding second locking slot 142, a pivot plate 16 pivotally mounted on the suspension bar 18 and including an upper end portion and a lower end portion, a cover 20 pivotally mounted on the casing 10 and including a first side wall 200, a second side wall 201 secured to the pivot plate 16, a closed wall 204 and an open wall, a sliding plate 22 slidably mounted on the first side wall 200 of the cover 20 and including a plurality of second locking hooks 222 each extending upward and each detachably received in the corresponding first locking slot 122, and a substantially U-shaped pivot bar 24 pivotally mounted on the closed wall 204 of the cover 20 and including a first leg 240 pivotally connected with the lower end portion of the sliding plate 22 and a second leg 242 pivotally connected with the lower end portion of the pivot plate 16.

A driving member 26 is pivotally mounted on the first side wall 200 of the cover 20 and includes a first end portion containing a socket 260 to allow insertion of a key 28 and a second end portion pivotally connected with the upper end portion of the sliding plate 22 by means of a linking shaft 262.

The suspension bar 18 includes a plurality of first ears 182 horizontally arranged, and the pivot plate 16 includes a plurality of second ears 162 horizontally arranged, and a plurality of pivot axles 183 each extends through the corresponding first ear 182 and the corresponding second ear 162 such that the pivot plate 16 can be pivoted relative to the suspension bar 18.

Each of the upper end portion and the lower end portion of the pivot plate 16 contains a substantially inverted U-shaped guiding slot 17 including a first locking section 174, a horizontal guiding section 172 and a second locking section 176 having a depth smaller than that of the first locking section 174, and the second side wall 201 of the cover 20 includes two guiding posts 202 each slidably extending through one of the guiding slots 17. By such an arrangement, the guiding post 202 can be movable between a first position where it is positioned in the first locking section 174 and a second position where it is positioned in the second locking section 176.

The lower end portion of the pivot plate 16 further contains a substantially inverted L-shaped guiding groove 19 including a horizontal guiding portion 192 and a vertical locking portion 194. A retaining bolt 245 extends through the second leg 242 of the pivot bar 24 and the guiding groove 19, and is engaged with an engaging nut 246.

In operation, referring to FIGS. 2–5 with reference to FIG. 1, each of the first locking hooks 184 can be snapped into the corresponding second locking slot 142 such that the cover 20 together with the pivot plate 16 can be pivoted relative to the casing 10 so as to cover the casing 10, wherein each of the second locking hooks 222 aligns with the corresponding first locking slot 122, and each of the guiding posts 202 aligns with the corresponding first locking section 174 as shown in FIG. 2.

Figure 3:
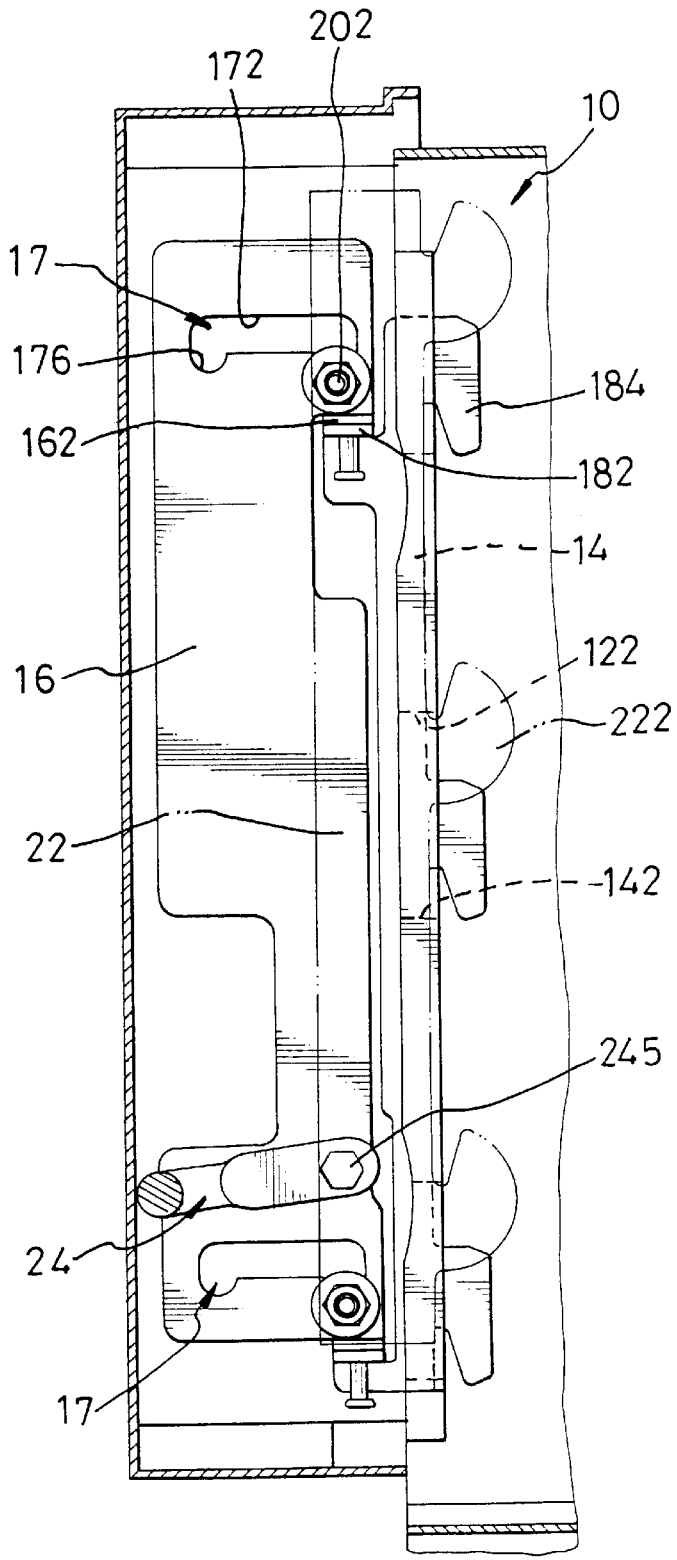
FIG. 3 is an operational view of the pay phone box structure as shown in FIG. 2.

The driving member 26 can then be rotated by means of rotating the key 28 in a counterclockwise direction to move the sliding plate 22 upward, thereby snapping each of the second locking hooks 222 upward into the corresponding first locking slot 122 as shown in FIG. 3 such that the cover 20 can be fixed to the casing 10. At the same time, the first leg 240 of the pivot bar 24 can be moved upward by the sliding plate 22 so as to pivot the pivot bar 24, thereby moving the second leg 242 upward so as to move the pivot plate 16 upward relative to the second side wall 201 of the cover 20 such that the each of the guiding posts 202 can be inserted into the first locking section 174 of the corresponding guiding slot 17 from the position as shown in FIG. 2 to the position as shown in FIG. 3, thereby securing the cover 20 on the casing 10.

The driving member 26 can then be rotated by means of rotating the key 28 in a clockwise direction to move the sliding plate 22 downward, thereby moving down each of the second locking hooks 222 so as to detach them from the corresponding first locking slot 122 as shown in FIG. 2 such that the cover 20 can be pivoted outward relative to the casing 10.

Figure 4:
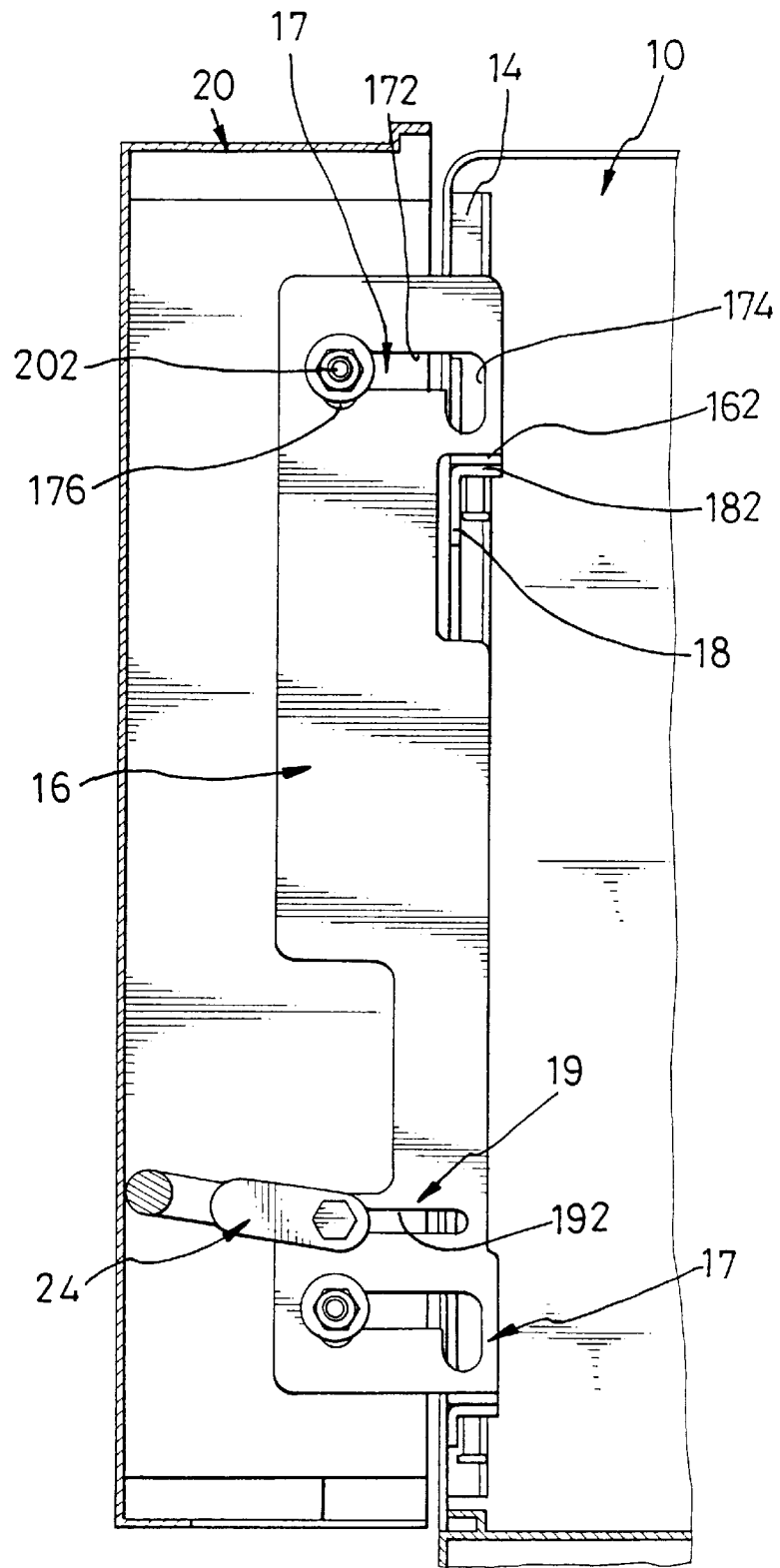
FIG. 4 is a front plan cross-sectional assembly view of the pay phone box structure as shown in FIG. 1, wherein the cover is released from the casing.
Figure 5:
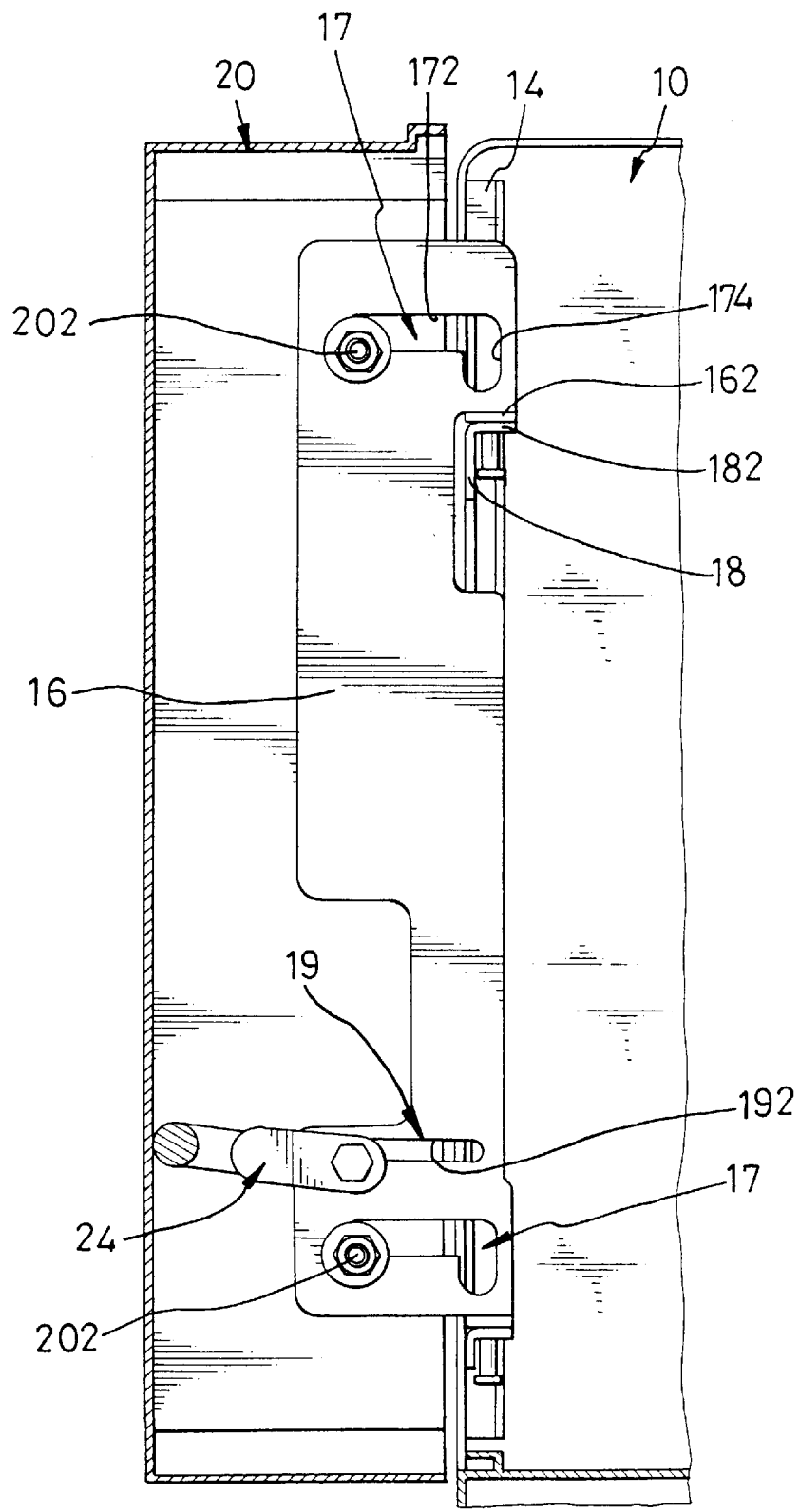
FIG. 5 is an operational view of the pay phone box structure as shown in FIG. 4.

At the same time, the first leg 240 of the pivot bar 24 can be moved downward by the sliding plate 22 so as to pivot the pivot bar 24, thereby moving the second leg 242 downward so as to move the pivot plate 16 downward relative to the second side wall 201 of the cover 20 such that each of the guiding posts 202 can be detached from the first locking section 174 of the guiding slot 17 from the position as shown in FIG. 3 to the position as shown in FIG. 2. In such a manner, the cover 20 can be pulled outward relative to the pivot plate 16, thereby displacing each of the guiding posts 202 along the horizontal section 172 of the guiding slot 17 from the position as shown in FIG. 2 to the position as shown in FIG. 4 so as to align with the second locking section 176. Then, the cover 20 can be forced downward relative to the pivot plate 16 such that each of the guiding posts 202 can be inserted into the second locking section 176 from the position as shown in FIG. 4 to the position as shown in FIG. 5, thereby securing the cover 20 to the pivot plate 16 to prevent the cover 20 from wobbling.

By such an arrangement, each of the first locking hooks 184 can be detached from the corresponding locking slot 142, thereby releasing the suspension bar 18 from the casing 10 such that the cover 20 can be removed from the casing 10, thereby increasing the convenience to maintain the pay phone box structure. In addition, the cover 20 can be replaced separately when it is worn out.

It should be clear to those skilled in the art that further embodiments may be made without departing from the scope and spirit of the present invention.

What is claimed is:

1. A pay phone box structure comprising:

a casing (10) including a first side wall (100) and a second side wall (101);

a first supporting plate (12) fixedly mounted on said first side wall (100) of said casing (10) and containing a plurality of elongated first locking slots (122);

a second supporting plate (14) fixedly mounted on said second side wall (101) of said casing (10) and containing a plurality of elongated second locking slots (142);

an elongated suspension bar (18) secured to said second supporting plate (14) and including a plurality of first locking hooks (184) each detachably received in the corresponding second locking slots (142);

a pivot plate (16) pivotally mounted on said suspension bar (18) and including an upper end portion and a lower end portion;

a cover (20) pivotally mounted on said casing (10) and including a first side wall (200), a second side wall (201) secured to said pivot plate (16), a closed wall (204) and an open wall;

a sliding plate (22) slidably mounted on said first side wall (200) of said cover (20) and including a plurality of second locking hooks (222) each detachably received in the corresponding first locking slots (122); and a substantially U-shaped pivot bar (24) pivotally mounted on said closed wall (204) of said cover (20) and including a first leg (240) pivotally connected with said sliding plate (22) and a second leg (242) pivotally connected with said lower end portion of said pivot plate (16).

2. The pay phone box structure in accordance with claim 1, wherein said suspension bar (18) includes a plurality of first ears (182) horizontally arranged, and said pivot plate (16) includes a plurality of second ears (162) horizontally arranged, and said pay phone box structure further comprises a plurality of pivot axles (183) each extending through the corresponding first ear (182) and the corresponding second ear (162).

3. The pay phone box structure in accordance with claim 1, wherein said upper end portion of said pivot plate (16) contains a substantially inverted U-shaped guiding slot (17) including a first locking section (174), a horizontal guiding section (172) and a second locking section (176), and said second side wall (201) of said cover (20) includes a guiding post (202) slidably extending through said guiding slot (17).

4. The pay phone box structure in accordance with claim 3, wherein said guiding post (202) is movable between a first position where it is positioned in said first locking section (174) and a second position where it is positioned in said second locking section (176).

5. The pay phone box structure in accordance with claim 3, wherein said second locking section (176) has a depth smaller than that of said first locking section (174).

6. The pay phone box structure in accordance with claim 1, wherein said lower end portion of said pivot plate (16) contains a substantially inverted L-shaped guiding groove (19) including a horizontal guiding portion (192) and a vertical locking portion (194), and said pay phone box structure further comprises a retaining bolt (245) extending through said second leg (242) of said pivot bar (24) and said guiding groove (19), and an engaging nut (246) engaged on said retaining bolt (245).

* * * * *